(12) United States Patent
Cen et al.

(10) Patent No.: US 11,176,816 B2
(45) Date of Patent: Nov. 16, 2021

(54) INTELLIGENT CLOUD TRAFFIC CONTROL SYSTEM AND TRAFFIC CONTROL METHOD

(71) Applicant: RESEARCH INSTITUTE OF HIGHWAY MINISTRY OF TRANSPORT, Beijing (CN)

(72) Inventors: Yanqing Cen, Beijing (CN); Xianghui Song, Beijing (CN); Dongzhu Wang, Beijing (CN); Liyang Lu, Beijing (CN); Nan Liu, Beijing (CN); Liwei Zhu, Beijing (CN); Ling Sun, Beijing (CN); Yameng Li, Beijing (CN); Dezao Hou, Beijing (CN); Honghai Li, Beijing (CN); Jiahai Zhao, Beijing (CN); Jian Gao, Beijing (CN); Qian Yi, Beijing (CN); Fengman Yang, Beijing (CN)

( * ) Notice: Subject to any disclaimer, the term of this patent is extended or adjusted under 35 U.S.C. 154(b) by 0 days.

(21) Appl. No.: 17/234,768

(22) Filed: Apr. 19, 2021

(65) Prior Publication Data

US 2021/0327263 A1    Oct. 21, 2021

(30) Foreign Application Priority Data

Apr. 21, 2020   (CN) .......................... 202010318729.9

(51) Int. Cl.
*G08G 1/01*    (2006.01)
*H04L 29/08*   (2006.01)

(52) U.S. Cl.
CPC ......... *G08G 1/0137* (2013.01); *G08G 1/0112* (2013.01); *G08G 1/0116* (2013.01);
(Continued)

(58) Field of Classification Search
CPC .. G08G 1/0137; G08G 1/0125; G08G 1/0112; G08G 1/0116; H04L 67/2842; H04L 67/10
See application file for complete search history.

(56) References Cited

U.S. PATENT DOCUMENTS 10,942,852 B1\*   3/2021   Tian ..................... G06F 12/0811
2015/0074743 A1\*  3/2015   Ilieva ...................... H04L 63/10
                                                              726/1
(Continued)

OTHER PUBLICATIONS

First Office Action of CN 202010318729.9.
Notification to Grant Patent Right.

*Primary Examiner* — Ajay Cattungal

(57) ABSTRACT

The present application provides an intelligent cloud traffic control system, which has a traffic data recalling and transmission architecture arranged hierarchically from bottom to top, and which includes: terminal devices, first-level cloud devices, second-level cloud devices, . . . $i^{th}$-level cloud devices; wherein the $i^{th}$-level cloud devices include a first cloud device, . . . a $j^{th}$ cloud device; the $i^{th}$-level cloud devices further include: a first cache cloud, . . . a $k^{th}$ cache cloud arranged corresponding to the $j^{th}$ cloud device; wherein the $j^{th}$ cloud device stores a $j^{th}$ cloud device traffic data set, and the $k^{th}$ cache cloud stores a $k^{th}$ characteristic traffic data set; and data in the $k^{th}$ characteristic traffic data set has a higher priority of being recalled than data in the $j^{th}$ cloud device traffic data set. Therefore, the present application can preferentially recall traffic data in the cache cloud that has a batter correspondence to task, a smaller range and even a better data structure, thereby significantly improving the data recalling rate and retrieval response efficiency of cloud devices at the same level and even the entire intelligent cloud traffic control system.

13 Claims, 3 Drawing Sheets

(52) U.S. Cl.
CPC ........... *G08G 1/0125* (2013.01); *H04L 67/10* (2013.01); *H04L 67/2842* (2013.01)

(56) References Cited

U.S. PATENT DOCUMENTS

| | | | |
|---|---|---|---|
| 2017/0316078 A1* | 11/2017 | Funke | H04L 67/1097 |
| 2018/0046808 A1* | 2/2018 | Cammarota | G06F 21/75 |
| 2018/0159745 A1* | 6/2018 | Byers | H04L 41/0896 |
| 2019/0044823 A1* | 2/2019 | Soundararajan | H04L 12/66 |
| 2020/0057665 A1* | 2/2020 | Kushmerick | G06K 9/6219 |
| 2020/0244702 A1* | 7/2020 | Ambardekar | H04L 63/20 |
| 2021/0081373 A1* | 3/2021 | Tian | G06F 3/067 |
| 2021/0165579 A1* | 6/2021 | Bernat | G06F 12/06 |

* cited by examiner

INTELLIGENT CLOUD TRAFFIC CONTROL SYSTEM AND TRAFFIC CONTROL METHOD

FIELD OF THE INVENTION

The present application relates to the technical field of traffic management, in particular to an intelligent cloud traffic control system and traffic control method.

BACKGROUND OF THE INVENTION

As the country's highway network is becoming more and more perfect, network nodes are increasing, and the demand for network system management is becoming increasingly urgent. On the other hand, technologies such as big data, Internet of Things, and artificial intelligence are continuously being promoted and applied. With the increasing development of technologies such as autonomous driving, intelligent networked vehicles, vehicle-road cooperation and cloud platforms, travel needs of road users and other people as well as data acquisition and sharing modes have become increasingly diversified.

The prior art such as Document 1 and Document 2 (see below for their document numbers) provides an intelligent cloud traffic control system architecture arranged hierarchically from bottom to top in sequence. Typically, the hierarchy may include the following from bottom to top: terminal devices (such as intelligent vehicle devices or intelligent roadside devices), edge clouds (or referred to as first-level cloud devices), regional clouds (or referred to as second-level cloud devices), and a central cloud (or referred to as a third-level cloud device). Generally, the edge clouds are distributed across multiple traffic sections to collect traffic data. The traffic data collected by the edge clouds is collectively sent to the regional clouds. The regional clouds then store and statistically analyze the traffic data, and send control instructions to the corresponding edge clouds according to the statistical analysis results to perform traffic control over the traffic scene. Moreover, a higher-level central cloud may be set according to regional distribution needs to further summarize the data of various regional clouds or recall and control the data of various regional clouds.

However, in the application conditions of traffic, especially road traffic, unlike data control and processing of a single individual intelligent vehicle or a single intelligent roadside device, there are often needs for transmission, storage, processing and interaction of massive vehicle-end and roadside-end data. Under the existing multi-level intelligent cloud control system, the edge clouds, the regional clouds and even the central cloud may each store a large amount of raw sensed data, intermediate data and result data of different types/structures. This also leads to a commonly seen problem of long-term response when cloud devices at the same level and cloud devices at upper and lower levels need to retrieve and recall relevant data from the current cloud device (for direct application or for further processing). The reason for this is that in addition to the factors of transmission distance and transmission delay, there are also several key influencing factors, such as the large amount of time spent in retrieving and recalling the required data from massive data of different types/structures. For another example, the individual computing power of current cloud device is limited, and for traffic conditions, the sensed data collected on different road sections or areas (which often correspond to different cloud devices) and the amount of data that needs to be operationally processed in real time are different. If the amount of processed data corresponding to the current cloud device is large and the computing power is therefore basically used up, it will be difficult to respond to additional data retrieving, recalling and processing requirements in a timely manner.

In addition, in the prior art, although conventional data optimization means such as data grading and classifying may be applied to current cloud devices to alleviate the problem of too long response time when recalling a large amount data of different types/structures to a certain extent, for the complex system architecture of road traffic and the application conditions of data transmission and recalling between multiple devices and multiple levels, it is still necessary to retrieve and recall data that meets the needs of the current task from the respective massive data pools of multiple cloud devices. Therefore, it is still difficult for the above conventional data optimization means to effectively solve the problem of time response when recalling big data of road traffic conditions. Moreover, since the data optimization and classification operations of the current cloud device have to occupy the computing resource of the cloud device, the problem of too long waiting time is caused due to the response to the processing of other real-time tasks.

Document 1: CN109688224A
Document 2: CN106251620B.

SUMMARY OF THE INVENTION

An object of the present application is to provide an intelligent cloud traffic control system and traffic control method to solve the problem in the prior art that the large amount of data and the diversification of data increase a retrieving workload in the recalling process and reduce the recalling efficiency.

In a first aspect of the present application, an intelligent cloud traffic control system is provided, which has a traffic data recalling and transmission architecture arranged hierarchically from bottom to top, and which includes:

terminal devices, first-level cloud devices, second-level cloud devices, . . . $i^{th}$-level cloud devices, where i is smaller than or equal to L, and L is an integer larger than or equal to 2;

wherein the $i^{th}$-level cloud devices include a first cloud device, . . . a $j^{th}$ cloud device, where j is smaller than or equal to M, and M is an integer larger than or equal to 1;

wherein the $i^{th}$-level cloud devices further include: a first cache cloud, . . . a $k^{th}$ cache cloud arranged corresponding to the $j^{th}$ cloud device, where k is smaller than or equal to N, and N is an integer larger than or equal to 1;

wherein the $j^{th}$ cloud device stores a $j^{th}$ cloud device traffic data set, and the $k^{th}$ cache cloud stores a $k^{th}$ characteristic traffic data set; and data in the $k^{th}$ characteristic traffic data set has a higher priority of being recalled than data in the $j^{th}$ cloud device traffic data set.

In the intelligent cloud traffic control system provided by the present application, several cache cloud devices corresponding to cloud devices at the same level can be provided, and the data in the $k^{th}$ characteristic traffic data set stored in the cache cloud can be made have a higher priority of being recalled than the data in the $j^{th}$ cloud device traffic data set; in this way, the characteristic traffic data set stores a smaller amount of data (such as characteristic traffic data of characteristics such as historical recalling frequency, data type and data structure), as is determined by "characteristics", so that it can be recalled with a priority according to task requirements. Therefore, as compared with traditional cloud devices in which massive data is stored, the present disclosure locks a smaller retrieval range and reduces the amount of data retrieved, thereby improving the efficiency of recalling characteristic traffic data, reducing the delay in recalling characteristic traffic data, reducing the workload of cloud devices in the process of recalling traffic data, and alleviating the burden of the cloud devices.

In a possible implementation of the first aspect of the present application, the data in the $k^{th}$ characteristic traffic data set comes from the $j^{th}$ cloud device at the same level, upper-level cloud devices, lower-level cloud devices, and/or the terminal devices.

In this way, if the data in the $j^{th}$ cloud device, the upper-level cloud devices, the lower-level cloud devices and/or the terminal devices has characteristics such as the specified historical recalling frequency and/or data type and data structure of a certain similarity, etc., the data will be sent to the $k^{th}$ cache cloud as characteristic traffic data to facilitate quick recalling and transmission as required by tasks, and even reduce the additional level-by-level transmission process and improve work efficiency.

In a possible implementation of the first aspect of the present application, the data in the $k^{th}$ characteristic traffic data set has a higher historical recalling frequency than the data in the $j^{th}$ cloud device traffic data set.

In this way, the conditions for storing traffic data in the $k^{th}$ cache cloud are based on the magnitude of the specified historical recalling frequency. When the historical recalling frequency of traffic data is higher than f, the traffic data will be sent to the $k^{th}$ cache cloud as the characteristic traffic data and stored in the $k^{th}$ characteristic traffic data set. When this type of traffic data is recalled again, data can be retrieved and screened directly in the $k^{th}$ characteristic traffic data set of the $k^{th}$ cache cloud, thereby improving the efficiency of recalling the characteristic traffic data.

In a possible implementation of the first aspect of the present application, the data in the $k^{th}$ characteristic traffic data set has a higher similarity of data type and/or structure than the data in the $j^{th}$ cloud device traffic data set.

In this way, the conditions for storing traffic data in the $k^{th}$ cache cloud are based on the similarity to a specified data type and/or structure; for example, when the similarity between the data type of the traffic data and a specified type (such as photo, character, video or sound type) is higher than s, or when the similarity between the data structure of the traffic data and a preset data structure is higher than s, the traffic data is sent to the $k^{th}$ cache cloud as characteristic traffic data and stored in the $k^{th}$ characteristic traffic data set; when the traffic data of this type or structure is recalled again, data can be directly retrieved and screened in the $k^{th}$ characteristic traffic data set of the $k^{th}$ cache cloud, thereby improving the efficiency of recalling the characteristic traffic data. Moreover, since the data with types and structures of high similarity are stored in a centralized manner, the efficiency of data retrieving and recalling can be further improved.

In a possible implementation of the first aspect of the present application, the $k^{th}$ characteristic traffic data set is a subset of the $j^{th}$ cloud device traffic data set.

In this way, the data in the cache cloud can be regarded as a kind of backup of the data in the cloud device at the same level. The backup is set up based on "characteristics" (such as high historical recalling frequency, data similarity, etc.), so that when the cloud device at the same level is shut down due to fault, some commonly used data can still be recalled from the cache cloud to fulfill task requirements.

In a possible implementation of the first aspect of the present application, there is no intersection between the $k^{th}$ characteristic traffic data set and the $j^{th}$ cloud device traffic data set.

In this way, the data in the cache cloud can be regarded as set up based on "characteristics" (such as high historical recalling frequency, data similarity, etc.), and is not generated with the data in the cloud device at the same level, which is helpful for increasing an effective use of the overall storage space.

In a possible implementation of the first aspect of the present application, the terminal devices include intelligent vehicle devices, traditional roadside devices, and/or intelligent roadside devices. The intelligent vehicle devices are configured to collect traffic vehicle data. The traditional roadside devices and the intelligent roadside devices are configured to collect traffic roadside data and/or implement the issuance and control of traffic control data.

In this way, the intelligent vehicle devices collect data such as vehicle speed, vehicle location, steering wheel angle, and brake pedal status, and the intelligent roadside devices collect road condition data including traffic flow, average vehicle speed, vehicle type, traffic light status, roadblock location, and the number and locations of pedestrians, so that the traffic data of a certain time period/time point and a certain road section/area can be recalled later. The use of the traffic data enables evidences of traffic accidents to be obtained or statistical analysis to be performed, so as to facilitate the planning of traffic control and layout of traffic infrastructure.

In a possible implementation of the first aspect of the present application, at least part of the data in the $k^{th}$ characteristic traffic data set comes from a plurality of the lower-level cloud devices or a plurality of the terminal devices; and the data transmitted by the plurality of the lower-level cloud devices or the plurality of the terminal devices to the $k^{th}$ characteristic traffic data set has a similarity of data type and/or structure that meets a first preset condition.

In this way, on the premise that the data transmitted by the plurality of the lower-level cloud devices or the plurality of the terminal devices to the $k^{th}$ characteristic traffic data set has a similarity of data type and/or structure that meets the first preset condition, the $k^{th}$ cache cloud can receive traffic data sent by the plurality of the lower-level cloud devices or the plurality of the terminal devices at the same time, which further improves the caching efficiency and the later retrieving and recalling efficiency of the traffic data having a similarity of data type and/or structure that meets the first preset condition.

In a possible implementation of the first aspect of the present application, the L is 3, the first-level cloud devices are edge cloud devices, the second-level cloud devices are regional cloud devices, and the third-level cloud device is a central cloud device.

In this way, the terminal devices collect vehicle traffic data and roadside traffic data, and the edge cloud devices collect the traffic data collected by the terminal devices. The first-level cloud devices are distributed across multiple road sections in designated areas, the second-level cloud devices are located in the designated areas, and the third-level cloud device is located in a designated large area, wherein the designated large area includes multiple designated areas, the designated areas include multiple road sections, and the decentralized data of multiple road sections is transmitted level by level and then managed in a centralized manner.

In a second aspect of the present application, a traffic control method is provided, which is applied to the intelligent cloud traffic control system described in any of the first aspect of the present application, and which includes:

collecting, by the terminal devices, traffic vehicle data and/or traffic roadside data, and transmitting and/or processing the data via the first-level cloud devices, the second-level cloud devices, ... the $i^{th}$-level cloud devices level by level;

generating, by other cloud devices at the same level as the $j^{th}$ cloud device, upper-level cloud devices, lower-level cloud devices, and/or the terminal devices, requests for recalled data to the $j^{th}$ cloud device; and if it is determined that the recalled data in the requests exists in the $k^{th}$ characteristic traffic data set, preferentially obtaining the recalled data from the $k^{th}$ characteristic traffic data set.

In a possible implementation of the second aspect of the present application, the method further includes:

determining that a computing power for real-time processed data of the $j^{th}$ cloud device, other cloud devices at the same level as the $j^{th}$ cloud device, and/or the lower-level cloud devices is insufficient;

sending at least part of the real-time processed data to the $k^{th}$ cache cloud; and performing, by the $k^{th}$ cache cloud, operational processing on the sent real-time processed data, and returning the result of the operation.

In this way, when the computing power for real-time processed data of other cloud devices at the same level as the $j^{th}$ cloud device and/or the lower-level cloud devices is insufficient, the $k^{th}$ cache cloud temporarily takes over the computing work of the other cloud devices at the same level as the $j^{th}$ cloud device and/or the lower-level cloud devices, and shares part of the workload of the other cloud devices at the same level as the $j^{th}$ cloud device and/or the lower-level cloud devices, which improves the time efficiency of responding to a task.

In a possible implementation of the second aspect of the present application, the method is applied to the intelligent cloud traffic control system described in a possible embodiment of the first aspect of the present application, and the method further includes:

determining that the data transmitted by one of the plurality of the lower-level cloud devices or one of the plurality of the terminal devices to the $k^{th}$ characteristic traffic data set no longer meets the first preset condition; and cancelling the data transmission relationship between the one of the plurality of the lower-level cloud devices or the one of the plurality of the terminal devices and the $k^{th}$ characteristic traffic data set.

In this way, the way of recalling the traffic data will undergo certain changes as time elapses, the policy adjusts and the data amount changes. For example, if the original road section is subject to traffic control and the traffic flow is therefore reduced, the data type or the data structure of traffic data recalled on this road section will change accordingly. When the way of recalling the traffic data changes, the data transmission relationship between one of the lower-level cloud devices or one of the plurality of the terminal devices and the $k^{th}$ characteristic traffic data set will be adjusted accordingly based on the first preset condition, so that traffic data that does not meet the first preset condition can be stopped from being added to the $k^{th}$ characteristic data set, which reduces the data that does not meet the first preset condition in the $k^{th}$ characteristic traffic data set at a later stage, achieves the effect of continuously updating the $k^{th}$ characteristic traffic data set, and reduces the data that does not meet the first preset condition in the $k^{th}$ characteristic traffic data set. Therefore, the data type, data structure and historical recalling frequency of data in the $k^{th}$ characteristic traffic data are made more singularized, which reduces the workload of additional retrieving and screening when recalling the required characteristic traffic data.

In a possible implementation of the second aspect of the present application, after cancelling the data transmission relationship with the $k^{th}$ characteristic traffic data set, the method further includes:

if it is determined that one of the plurality of the lower-level cloud devices or one of the plurality of the terminal devices meets a preset condition of similarity of data type and/or structure of other characteristic traffic data sets, then establishing its data transmission relationship with the other characteristic traffic data sets.

In this way, after the transmission relationship is re-established according to the preset condition of similarity of data type and/or structure of the other characteristic traffic data sets, specific "characteristic" data can be transmitted to and stored in other cache clouds.

BRIEF DESCRIPTION OF THE DRAWINGS

In order to more clearly describe embodiments of the present application or technical solutions in the prior art, the drawings that need to be used in the description of the embodiments or the prior art will be briefly introduced in the following. Obviously, the drawings in the following description are only illustrative. For those skilled in the art, other implementation drawings may also be derived from these provided drawings without creative work.

The text descriptions, connection relationships and the like shown in this specification are only used for reading and understanding by people familiar with this art in cooperation with the contents disclosed in the specification. They are not intended to limit the defined conditions for implementation of the present application, so they do have not technically substantive significance. Any form of modification, any change to the connection relationships or any adjustment to the text descriptions, without affecting the effects and objects that can be achieved by the present application, should still fall within the scope that can be covered by the technical content disclosed in the present application.

DETAILED DESCRIPTION OF THE EMBODIMENT(S) OF THE INVENTION

In order to make the objects, technical solutions and advantages of the embodiments of the present application clearer, the technical solutions in the embodiments of the present application will be described below clearly and completely in conjunction with the drawings in the embodiments of the present application. Obviously, the described embodiments are only part of the embodiments of the present application, but not all of the embodiments. Based on the embodiments in the present application, all other embodiments obtained by those skilled in the art without creative work shall fall within the scope of protection of the present application.

The terms used in the embodiments of the present application are only for the purpose of describing specific embodiments, and are not intended to limit the present application. The singular forms "a", "said" and "the" used in the embodiments of the present application are also intended to include the plural form, unless the context clearly indicates other meanings.

It should be understood that the term "and/or" used herein only indicates an association relationship describing associated objects, indicating that there may be three types of relationships. For example, A and/or B can mean the following three cases: A exists alone, or A and B exist at the same time, or B exists alone. In addition, the symbol "/" in this document generally indicates that the associated objects in front of and behind this symbol are in an "or" relationship.

Depending on the context, the words "if" and "in case of . . . " as used herein can be interpreted as "when" or "at the time of . . . " or "in response to the determination of . . . " or "in response to the detection of . . . ". Similarly, depending on the context, the phrase "if it is determined that . . . " or "if the stated condition or event is detected" can be interpreted as "when it is determined that . . . " or "in response to the determination of . . . " or "when the stated condition or event is detected" or "in response to the detection of the stated condition or event.

It should also be noted that the terms "include", "contain" or any other variation thereof are intended to cover non-exclusive inclusion, so that a commodity or system that includes a series of elements not only includes those elements, but also includes other elements that are not explicitly listed, or also include elements inherent to this commodity or system. If there are no more restrictions, the element defined by the sentence "including one . . . " does not exclude the existence of other identical elements in the commodity or system that includes that element.

Figure 1:
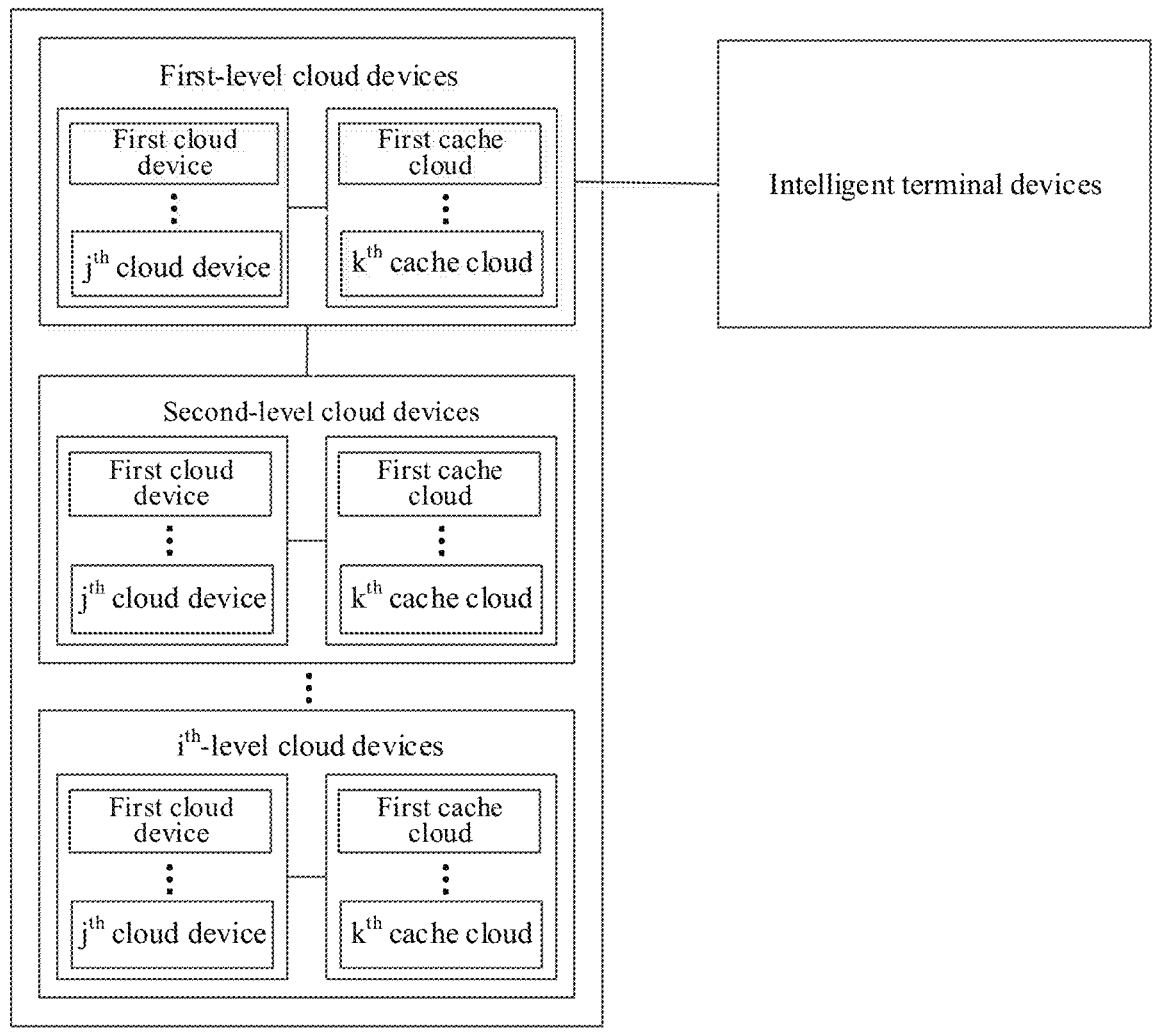
FIG. 1 is a schematic diagram of an architecture of an intelligent cloud traffic control system in a first embodiment of the present application.

FIG. 1 is a schematic diagram of an architecture of an intelligent cloud traffic control system in a first embodiment of the present application.

As shown in FIG. 1, in the first embodiment of the present application, an intelligent cloud traffic control system is provided, which has a traffic data recalling and transmission architecture arranged hierarchically from bottom to top, and which includes: terminal devices, first-level cloud devices, second-level cloud devices, . . . $i^{th}$-level cloud devices, where i is smaller than or equal to L, and L is an integer larger than or equal to 2; wherein the $i^{th}$-level cloud devices include a first cloud device, . . . a $j^{th}$ cloud device, where j is smaller than or equal to M, and M is an integer larger than or equal to 1; wherein the $i^{th}$-level cloud devices further include: a first cache cloud, . . . a $k^{th}$ cache cloud arranged corresponding to the $j^{th}$ cloud device, where k is smaller than or equal to N, and N is an integer larger than or equal to 1; wherein the $j^{th}$ cloud device stores a $j^{th}$ cloud device traffic data set, and the $k^{th}$ cache cloud stores a $k^{th}$ characteristic traffic data set; and data in the $k^{th}$ characteristic traffic data set has a higher priority of being recalled than data in the $j^{th}$ cloud device traffic data set. In this way, the data in the $k^{th}$ characteristic traffic data set is mainly characteristic traffic data including characteristics such as a specified historical recalling frequency, data type, data structure, etc. When recalling the required characteristic traffic data, retrieving and screening are preferentially performed in the $k^{th}$ characteristic traffic data set stored in the $k^{th}$ cache cloud. As compared with the prior art in which the retrieving and screening are performed in all traffic databases, the present disclosure can lock a smaller retrieval range and reduce the amount of data retrieved, thereby improving the efficiency of recalling characteristic traffic data, reducing the delay in recalling characteristic traffic data, reducing the workload of cloud devices in the process of recalling characteristic traffic data (the work including transmission, computing, storage, etc.), and alleviating the burden of the cloud devices; on the other hand, when a computing power of the $j^{th}$ cloud device is insufficient, the corresponding $k^{th}$ cache cloud temporarily takes over the work of the $j^{th}$ cloud device and shares part of the workload of the computing work of the $j^{th}$ cloud device.

In the first embodiment, the data in the $k^{th}$ characteristic traffic data set comes from the $j^{th}$ cloud device at the same level, upper-level cloud devices, lower-level cloud devices, and/or the terminal devices. In this way, if the data in the $j^{th}$ cloud device, the upper-level cloud devices, the lower-level cloud devices and/or the terminal devices has characteristics such as the specified historical recalling frequency, data type and data structure, etc., the data is sent to the $k^{th}$ cache cloud as characteristic traffic data to facilitate quick recalling and transmission as required by tasks. There is even no need for level-by-level transmission, and the way of data transmission is flexible, thereby reducing the additional level-by-level transmission process and improving work efficiency.

In the first embodiment, the data in the $k^{th}$ characteristic traffic data set has a higher historical recalling frequency than the data in the $j^{th}$ cloud device traffic data set. In this way, the conditions for storing traffic data in the $k^{th}$ cache cloud are based on the magnitude of the specified historical recalling frequency. When the historical recalling frequency of traffic data is higher than f, the traffic data will be sent to the $k^{th}$ cache cloud as the characteristic traffic data and stored in the $k^{th}$ characteristic traffic data set. When this type of traffic data is recalled again, data can be retrieved and screened directly in the $k^{th}$ characteristic traffic data set of the $k^{th}$ cache cloud, thereby improving the efficiency of recalling the characteristic traffic data.

In the first embodiment, the data in the $k^{th}$ characteristic traffic data set has a higher similarity of data type and/or structure than the data in the $j^{th}$ cloud device traffic data set. In this way, the conditions for storing traffic data in the $k^{th}$ cache cloud are based on the similarity to a specified data type and/or structure; for example, when the similarity between the data type of the traffic data and a specified type (such as photo, character, video or sound type) is higher than s, or when the similarity between the data structure of the traffic data and a preset data structure is higher than s, the traffic data is sent to the $k^{th}$ cache cloud as characteristic traffic data and stored in the $k^{th}$ characteristic traffic data set; when the traffic data of this type is recalled again, data can be directly retrieved and screened in the $k^{th}$ characteristic traffic data set of the $k^{th}$ cache cloud, thereby improving the efficiency of recalling the characteristic traffic data.

In the first embodiment, the $k^{th}$ characteristic traffic data set is a subset of the $j^{th}$ cloud device traffic data set. In this way, the data in the cache cloud can be regarded as a kind of backup of the data in the cloud device at the same level. The backup is set up based on "characteristics" (such as high historical recalling frequency, data similarity, etc.), so that when the cloud device at the same level is shut down due to fault, some commonly used data can still be recalled from the cache cloud to fulfill task requirements.

In the first embodiment, there is no intersection between the $k^{th}$ characteristic traffic data set and the $j^{th}$ cloud device traffic data set. In this way, the data in the cache cloud can be regarded as set up based on "characteristics" (such as high historical recalling frequency, data similarity, etc.), and is not generated with the data in the cloud device at the same level, which is helpful for increasing an effective use of the overall storage space.

In the first embodiment, the terminal devices include intelligent vehicle devices and/or intelligent roadside devices. The intelligent vehicle devices are configured to collect traffic vehicle data, and the intelligent roadside devices are configured to collect traffic roadside data. In this way, the intelligent vehicle devices collect vehicle data such as vehicle speed, vehicle steering, whistling, and the number of passengers, and the intelligent roadside devices collect road condition data including traffic light status, the number and location of vehicle, roadblock location, the number and locations of pedestrians, etc., so that the traffic data of a certain time period/time point and a certain road section/area can be recalled later. The use of the traffic data enables evidences of traffic accidents to be obtained or statistical analysis to be performed, so as to facilitate the planning of traffic control and layout of traffic infrastructure.

In the first embodiment, at least part of the data in the $k^{th}$ characteristic traffic data set comes from a plurality of the lower-level cloud devices or a plurality of the terminal devices, and the data transmitted by the plurality of the lower-level cloud devices or the plurality of the terminal devices to the $k^{th}$ characteristic traffic data set has a similarity of data type and/or structure that meets a first preset condition. In this way, on the premise that the data transmitted by the plurality of the lower-level cloud devices or the plurality of the terminal devices to the $k^{th}$ characteristic traffic data set has a similarity of data type and/or structure that meets the first preset condition, the $k^{th}$ cache cloud can receive traffic data sent by the plurality of the lower-level cloud devices or the plurality of the terminal devices at the same time, which further improves the caching efficiency of the traffic data having a similarity of data type and/or structure that meets the first preset condition, wherein the first preset condition may be a specified numerical interval, such as an interval of the similarity s: [25%, 100%]; preferably, the interval of the similarity s is [80%, 100%].

In the first embodiment, L is 3, the first-level cloud devices are edge cloud devices, the second-level cloud devices are regional cloud devices, and the third-level cloud device is a central cloud device. In this way, the terminal devices collect vehicle traffic data and roadside traffic data, and the edge cloud devices collect the traffic data collected by the terminal devices. The first-level cloud devices are distributed across multiple road sections in designated areas, the second-level cloud devices are located in the designated areas, and the third-level cloud device is located in a designated large area, wherein the designated large area includes multiple designated areas, the designated areas include multiple road sections, and the decentralized data of multiple road sections is transmitted level by level and then managed in a centralized manner.

Figure 2A:
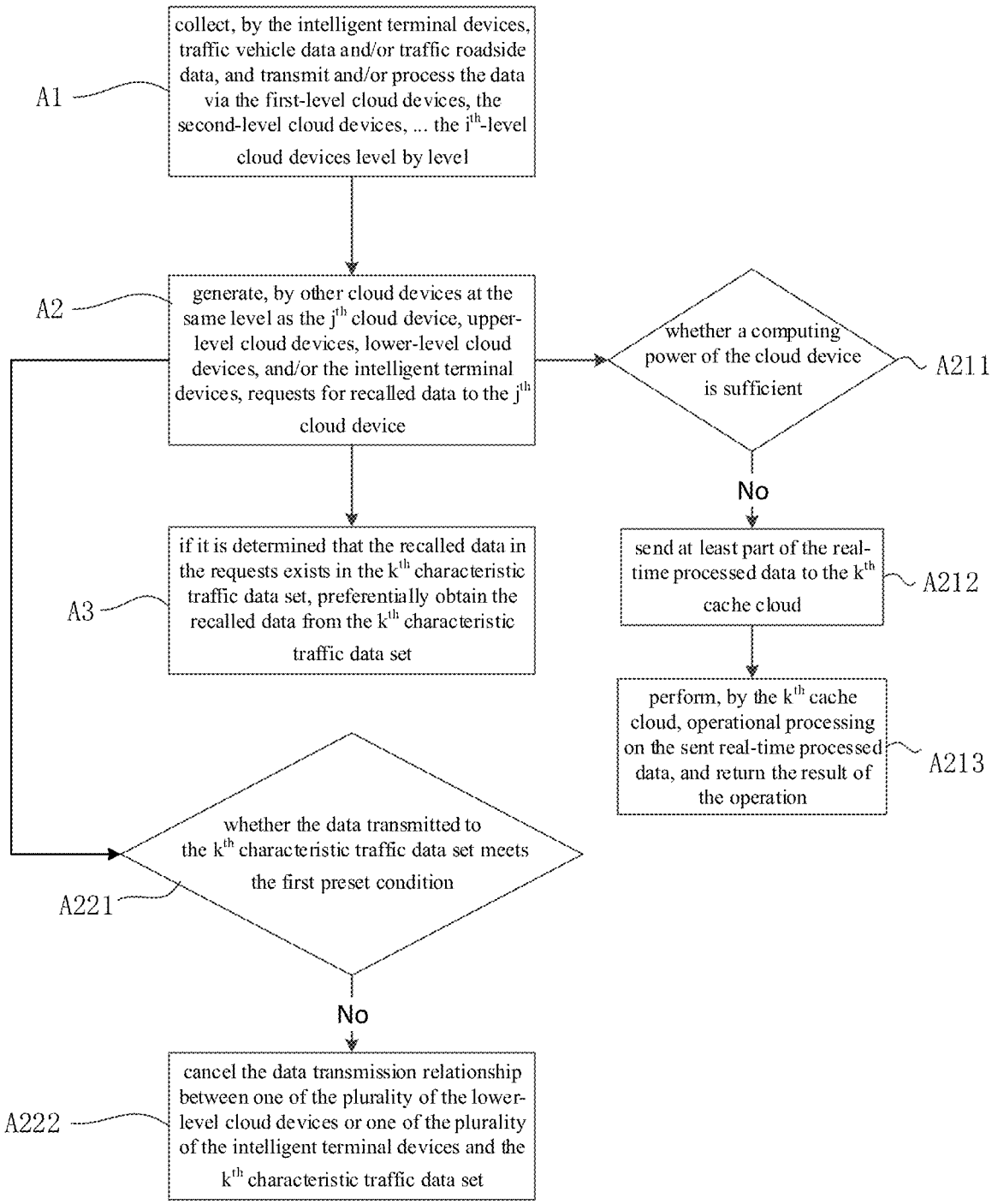
FIG. 2a is a schematic flowchart of a traffic control method in a second embodiment of the present application.

FIG. 2a is a schematic flowchart of a traffic control method in a second embodiment of the present application.

As shown in FIG. 2a, in the second embodiment of the present application, a traffic control method is provided, which is applied to any intelligent cloud traffic control system in the first embodiment of the present application, and which includes:

A1: collecting, by the terminal devices, traffic vehicle data and/or traffic roadside data, and transmitting and/or processing the data via the first-level cloud devices, the second-level cloud devices, . . . the $i^{th}$-level cloud devices level by level;

A2: generating, by other cloud devices at the same level as the $j^{th}$ cloud device, upper-level cloud devices, lower-level cloud devices, and/or the terminal devices, requests for recalled data to the $j^{th}$ cloud device; and A3: if it is determined that the recalled data in the requests exists in the $k^{th}$ characteristic traffic data set, preferentially obtaining the recalled data from the $k^{th}$ characteristic traffic data set.

In this way, as compared with the prior art in which the retrieving and screening are performed in all traffic databases, the present disclosure can lock a smaller retrieval range and reduce the amount of data retrieved, thereby improving the efficiency of recalling characteristic traffic data, reducing the delay in recalling characteristic traffic data, reducing the workload of cloud devices in the process of recalling characteristic traffic data, and alleviating the burden of the cloud devices.

In the second embodiment, the method further includes:

A211: determining that a computing power for real-time processed data of the $j^{th}$ cloud device, other cloud devices at the same level as the $j^{th}$ cloud device, and/or lower-level cloud devices is insufficient;

A212: sending at least part of the real-time processed data to the $k^{th}$ cache cloud; and A213: performing, by the $k^{th}$ cache cloud, operational processing on the sent real-time processed data, and returning the result of the operation.

In this way, when the computing power for real-time processed data of other cloud devices at the same level as the $j^{th}$ cloud device and/or the lower-level cloud devices is insufficient, the $k^{th}$ cache cloud temporarily takes over the computing work of the other cloud devices at the same level as the $j^{th}$ cloud device and/or the lower-level cloud devices, and shares part of the workload of the other cloud devices at the same level as the $j^{th}$ cloud device and/or the lower-level cloud devices.

In the second embodiment, the method is applied to the intelligent cloud traffic control system in a possible embodiment of the first embodiment of the present application, and the method further includes:

A221: determining that the data transmitted by one of the plurality of the lower-level cloud devices or one of the plurality of the terminal devices to the $k^{th}$ characteristic traffic data set no longer meets the first preset condition; and A222: cancelling the data transmission relationship between the one of the plurality of the lower-level cloud devices or the one of the plurality of the terminal devices and the $k^{th}$ characteristic traffic data set.

In this way, the way of recalling the traffic data will undergo certain changes as time elapses, the policy adjusts and the data amount changes. For example, if the original road section is subject to traffic control and the traffic flow is therefore reduced, the data type or the data structure of traffic data recalled on this road section will change accordingly. When the way of recalling the traffic data changes, the data transmission relationship between one of the lower-level cloud devices or one of the plurality of the terminal devices and the $k^{th}$ characteristic traffic data set will be adjusted accordingly based on the first preset condition, so that traffic data that does not meet the first preset condition can be stopped from being added to the $k^{th}$ characteristic data set, which reduces the data that does not meet the first preset condition in the $k^{th}$ characteristic traffic data set at a later stage, achieves the effect of continuously updating the $k^{th}$ characteristic traffic data set, and reduces the data that does not meet the first preset condition in the $k^{th}$ characteristic traffic data set. Therefore, the data type, data structure and historical recalling frequency of data in the $k^{th}$ characteristic traffic data are made more singularized, which reduces the workload of additional retrieving and screening when recalling the required characteristic traffic data.

Figure 2B:
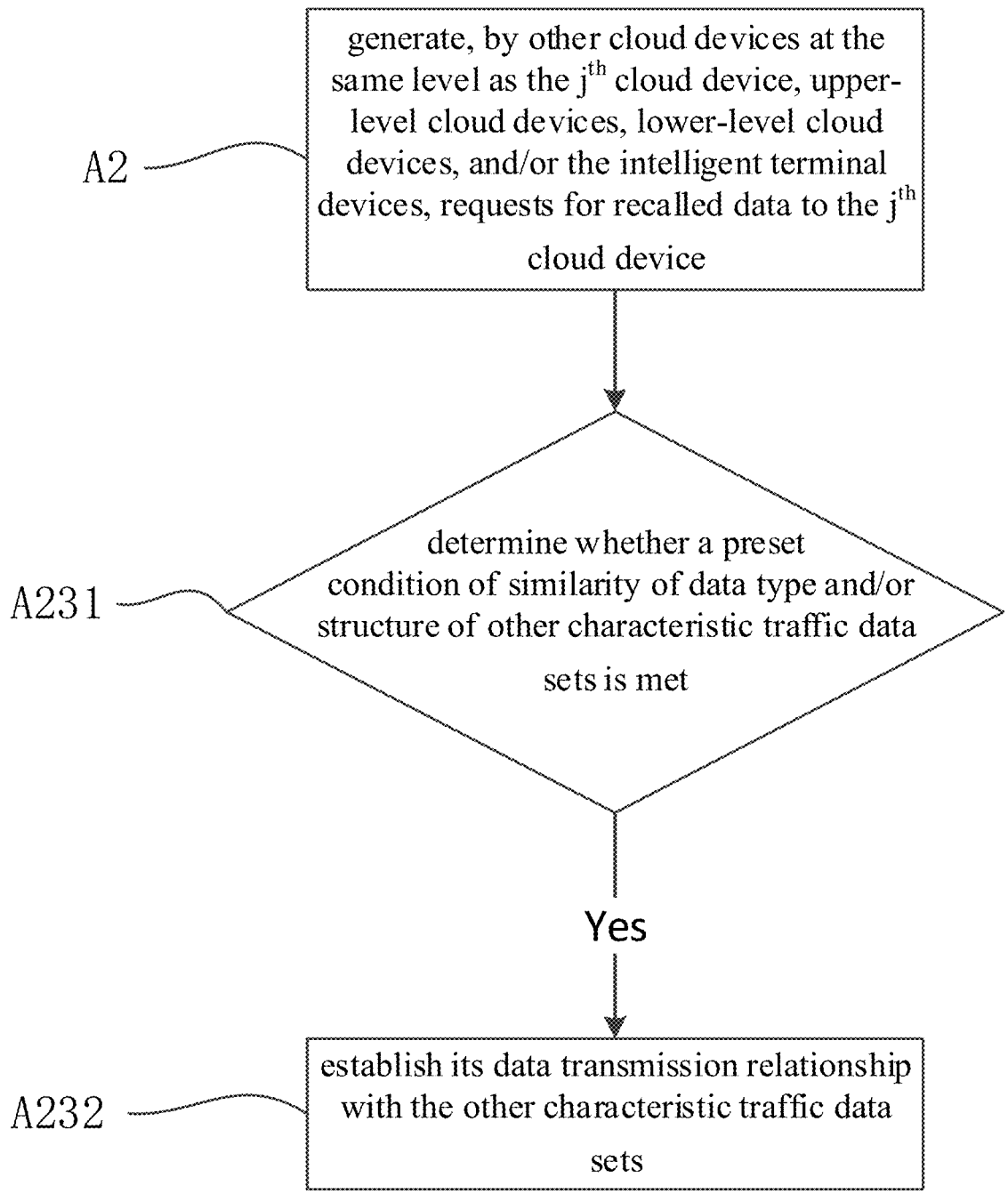
FIG. 2b is an exemplary method flowchart in the second embodiment of the present application.

FIG. 2b is an exemplary method flowchart in the second embodiment of the present application.

With reference to FIG. 2b, in the second embodiment, after cancelling the data transmission relationship with the $k^{th}$ characteristic traffic data set, the method further includes:

A231: determining that one of the plurality of the lower-level cloud devices or one of the plurality of the terminal devices meets a preset condition of similarity of data type and/or structure of other characteristic traffic data sets; and A232: establishing its data transmission relationship with the other characteristic traffic data sets.

In this way, after the transmission relationship is re-established according to the preset condition of similarity of data type and/or structure of the other characteristic traffic data sets, specific "characteristic" data can be transmitted to and stored in other cache clouds.

It can be clearly understood by those skilled in the art that for the convenience and conciseness of the description, only the division of the above-mentioned various functional modules is used as an example for illustration, such as "terminal device", "cloud device", "cache cloud", "upper-level cloud", "low-level cloud", etc. In actual applications, allocation of the above-mentioned functions may be completed by different functional modules according to needs, that is, the internal structure of the device is divided into different functional modules to complete all or part of the functions described above. For the specific working process of the device described above, reference may be made to the corresponding process in the foregoing method embodiment, and a repeated description is omitted herein.

It is worth noting that in the above method and system embodiments, the included modules are only divided according to functional logic, but the present disclosure is not limited to the above division, as long as the corresponding functions can be realized; in addition, the specific names of the various functional modules are only for the convenience of distinguishing each other, and are not used to limit the scope of protection of the present application.

In addition, it can be understood by those skilled in the art that all or part of the steps in the methods of the foregoing embodiments can be implemented by a program instructing relevant hardware, and the corresponding program can be stored in a computer readable storage medium, such as ROM/RAM, magnetic disc or compact disc, etc.

Finally, it should be noted that the above embodiments are only used to illustrate the technical solutions of the present application, but not to limit them; although the present application has been described in detail with reference to the foregoing embodiments, those skilled in the art should understand that they can still modify the technical solutions recorded in the foregoing various embodiments, or equivalently replace some or all of the technical features therein, and these modifications or replacements will not cause the essence of the corresponding technical solutions to deviate from the scope of the technical solutions of the embodiments of the present application.

What is claimed is:

1. An intelligent cloud traffic control system, the system having a traffic data recalling and transmission architecture arranged hierarchically from bottom to top, and comprising: terminal devices, first-level cloud devices, second-level cloud devices, . . . $i^{th}$-level cloud devices, where i is smaller than or equal to L, and L is an integer larger than or equal to 2;

wherein the $i^{th}$-level cloud devices comprise a first cloud device, . . . a $j^{th}$ cloud device, where j is smaller than or equal to M, and M is an integer larger than or equal to 1;

characterized in that the $i^{th}$-level cloud devices further comprise: a first cache cloud, . . . a $k^{th}$ cache cloud arranged corresponding to the $j^{th}$ cloud device, where k is smaller than or equal to N, and N is an integer larger than or equal to 1;

wherein the $j^{th}$ cloud device stores a $j^{th}$ cloud device traffic data set, and the $k^{th}$ cache cloud stores a $k^{th}$ characteristic traffic data set; and data in the $k^{th}$ characteristic traffic data set has a higher priority of being recalled than data in the $j^{th}$ cloud device traffic data set.

2. The intelligent cloud traffic control system according to claim 1, wherein the data in the $k^{th}$ characteristic traffic data set comes from the $j^{th}$ cloud device at the same level, upper-level cloud devices, lower-level cloud devices, and/or the terminal devices.

3. The intelligent cloud traffic control system according to claim 2, wherein the data in the $k^{th}$ characteristic traffic data set has a higher historical recalling frequency than the data in the $j^{th}$ cloud device traffic data set.

4. The intelligent cloud traffic control system according to claim 2, wherein the data in the $k^{th}$ characteristic traffic data set has a higher similarity of data type and/or structure than the data in the $j^{th}$ cloud device traffic data set.

5. The intelligent cloud traffic control system according to claim 1, wherein the $k^{th}$ characteristic traffic data set is a subset of the $j^{th}$ cloud device traffic data set.

6. The intelligent cloud traffic control system according to claim 1, wherein there is no intersection between the $k^{th}$ characteristic traffic data set and the $j^{th}$ cloud device traffic data set.

7. The intelligent cloud traffic control system according to claim 1, wherein the terminal devices comprise intelligent vehicle devices, traditional roadside devices, and/or intelligent roadside devices, the intelligent vehicle devices are configured to collect traffic vehicle data, and the traditional roadside devices and the intelligent roadside devices are configured to collect traffic roadside data and/or implement the issuance and control of traffic control data.

8. The intelligent cloud traffic control system according to claim 2, wherein at least part of the data in the $k^{th}$ characteristic traffic data set comes from a plurality of the lower-level cloud devices or a plurality of the terminal devices; and the data transmitted by the plurality of the lower-level cloud devices or the plurality of the terminal devices to the $k^{th}$ characteristic traffic data set has a similarity of data type and/or structure that meets a first preset condition.

9. The intelligent cloud traffic control system according to claim 1, wherein the L is 3, the first-level cloud devices are edge cloud devices, the second-level cloud devices are regional cloud devices, and the third-level cloud device is a central cloud device.

10. A traffic control method, characterized in that the method is applied to the intelligent cloud traffic control system according to claim 1, the method comprising:

collecting, by the terminal devices, traffic vehicle data and/or traffic roadside data, and transmitting and/or processing the data via the first-level cloud devices, the second-level cloud devices, ... the $i^{th}$-level cloud devices level by level;

generating, by other cloud devices at the same level as the $j^{th}$ cloud device, upper-level cloud devices, lower-level cloud devices, and/or the terminal devices, requests for recalled data to the $j^{th}$ cloud device; and if it is determined that the recalled data in the requests exists in the $k^{th}$ characteristic traffic data set, preferentially obtaining the recalled data from the $k^{th}$ characteristic traffic data set.

11. The traffic control method according to claim 10, further comprising:

determining that a computing power for real-time processed data of the $j^{th}$ cloud device, other cloud devices at the same level as the $j^{th}$ cloud device, and/or the lower-level cloud devices is insufficient;

sending at least part of the real-time processed data to the $k^{th}$ cache cloud; and performing, by the $k^{th}$ cache cloud, operational processing on the sent real-time processed data, and returning the result of the operation.

12. The traffic control method according to claim 10, wherein the method is applied to the intelligent cloud traffic control system according to claim 8, and the method further comprises:

determining that the data transmitted by one of the plurality of the lower-level cloud devices or one of the plurality of the terminal devices to the $k^{th}$ characteristic traffic data set no longer meets the first preset condition; and cancelling the data transmission relationship between the one of the plurality of the lower-level cloud devices or the one of the plurality of the terminal devices and the $k^{th}$ characteristic traffic data set.

13. The traffic control method according to claim 12, wherein after cancelling the data transmission relationship with the $k^{th}$ characteristic traffic data set, the method further comprises:

if it is determined that one of the plurality of the lower-level cloud devices or one of the plurality of the terminal devices meets a preset condition of similarity of data type and/or structure of other characteristic traffic data sets, then establishing its data transmission relationship with the other characteristic traffic data sets.

* * * * *